United States Patent
Srikantam et al.

(10) Patent No.: US 12,108,029 B2
(45) Date of Patent: Oct. 1, 2024

(54) METHOD AND SYSTEM OF VIDEO CODING WITH EFFICIENT FRAME LOSS RECOVERY

(71) Applicant: Intel Corporation, Santa Clara, CA (US)

(72) Inventors: Sri Ranjan Srikantam, Hillsboro, OR (US); Prasanna Kumar Mandapadi Ramasubramanian, Portland, OR (US); Changliang Wang, Bellevue, WA (US); Kseniya Tikhomirova, Nizhny Novgorod (RU); Sergey Solodkov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 17/133,324

(22) Filed: Dec. 23, 2020

(65) Prior Publication Data
US 2021/0120232 A1    Apr. 22, 2021

(51) Int. Cl.
| | |
|---|---|
| *H04N 19/105* | (2014.01) |
| *H04N 19/146* | (2014.01) |
| *H04N 19/159* | (2014.01) |
| *H04N 19/172* | (2014.01) |
| *H04N 19/30*  | (2014.01) |

(52) U.S. Cl.
CPC ......... *H04N 19/105* (2014.11); *H04N 19/146* (2014.11); *H04N 19/159* (2014.11); *H04N 19/172* (2014.11); *H04N 19/30* (2014.11)

(58) Field of Classification Search
CPC .... H04N 19/30; H04N 19/164; H04N 19/166; H04N 19/105; H04N 19/146; H04N 19/159; H04N 19/172
See application file for complete search history.

(56) References Cited

U.S. PATENT DOCUMENTS

| | | | |
|---|---|---|---|
| 10,536,708 B2 | 1/2020 | Ramasubramanian et al. | |
| 10,681,382 B1 | 6/2020 | Brailovskiy | |
| 2007/0091816 A1 | 4/2007 | Lee et al. | |
| 2011/0228845 A1 | 9/2011 | Banerjee | |
| 2011/0268175 A1* | 11/2011 | Tan | H04N 19/895 375/E7.026 |
| 2015/0103885 A1* | 4/2015 | Feng | H04N 19/895 375/240.02 |
| 2017/0070738 A1* | 3/2017 | Lee | H04N 19/174 |
| 2018/0343098 A1 | 11/2018 | Goel et al. | |
| 2019/0089966 A1* | 3/2019 | Mandapadi Ramasubramanian | H04N 19/109 |
| 2020/0322691 A1 | 10/2020 | Hui | |
| 2021/0120232 A1 | 4/2021 | Srikantam et al. | |
| 2021/0377330 A1* | 12/2021 | Trayanov | H04N 21/8456 |

OTHER PUBLICATIONS

International Preliminary Report on Patentability from PCT/US2021/050659 notified Jul. 6, 2023, 8 pgs.
Liu, Y. et al., "Improve Encoding Efficiency and Video Quality with Adaptive LTR", Visual and Graphics Tools; Feb. 22, 2018.

(Continued)

*Primary Examiner* — Kyle M Lotfi
(74) *Attorney, Agent, or Firm* — Akona IP PC

(57) ABSTRACT

Techniques related to video coding include efficient frame loss recovery using a feedback channel acknowledgement to decode base layer frames.

25 Claims, 11 Drawing Sheets

(56) References Cited

OTHER PUBLICATIONS

Ott, et al., "Extended RTP Profile for Real-time Transport Control Protocol (RTCP)-Based Feedback (RTP/AVPF)", Network Working Group, Request for Comments: 4585; Helsinki University of Technology; Jul. 2006.

International Search Report and Written Opinon for PCT Patent Application No. PCT/US2021/050659, dated Jan. 4, 2022.

* cited by examiner

OBTAIN INPUT FRAMES OF A VIDEO SEQUENCE TO BE COMPRESSED
202

↓

RECEIVE ACKNOWLEDGEMENT MESSAGES THAT ACKNOWLEDGE AN INDIVIDUAL BASE LAYER FRAME OF A MULTI-LAYER INTER-PREDICTION REFERENCE FRAME STRUCTURE HAS SUFFICIENT DATA TO BE DECODED
204

↓

UPDATE THE INTER-PREDICTION REFERENCE FRAME STRUCTURE TO BE USED TO ENCODE THE INPUT FRAMES DEPENDING ON WHETHER OR NOT THE INDIVIDUAL BASE LAYER FRAME HAS THE ACKNOWLEDGEMENT
206

OBTAIN COMPRESSED FRAMES OF A VIDEO SEQUENCE
302

↓

DETERMINE WHETHER A COMPRESSED FRAME OF THE VIDEO SEQUENCE THAT IS A BASE LAYER FRAME OF A MULTI-LAYER INTER-PREDICTION REFERENCE FRAME STRUCTURE HAS SUFFICIENT DATA TO BE DECODED
304

↓

TRANSMIT AN ACKNOWLEDGEMENT MESSAGE WHEN AN INDIVIDUAL BASE LAYER FRAME HAS SUFFICIENT DATA TO BE DECODED, AND OMIT THE TRANSMISSION OF THE ACKNOWLEDGEMENT WHEN THE INDIVIDUAL FRAME DOES NOT HAVE SUFFICIENT DATA
306

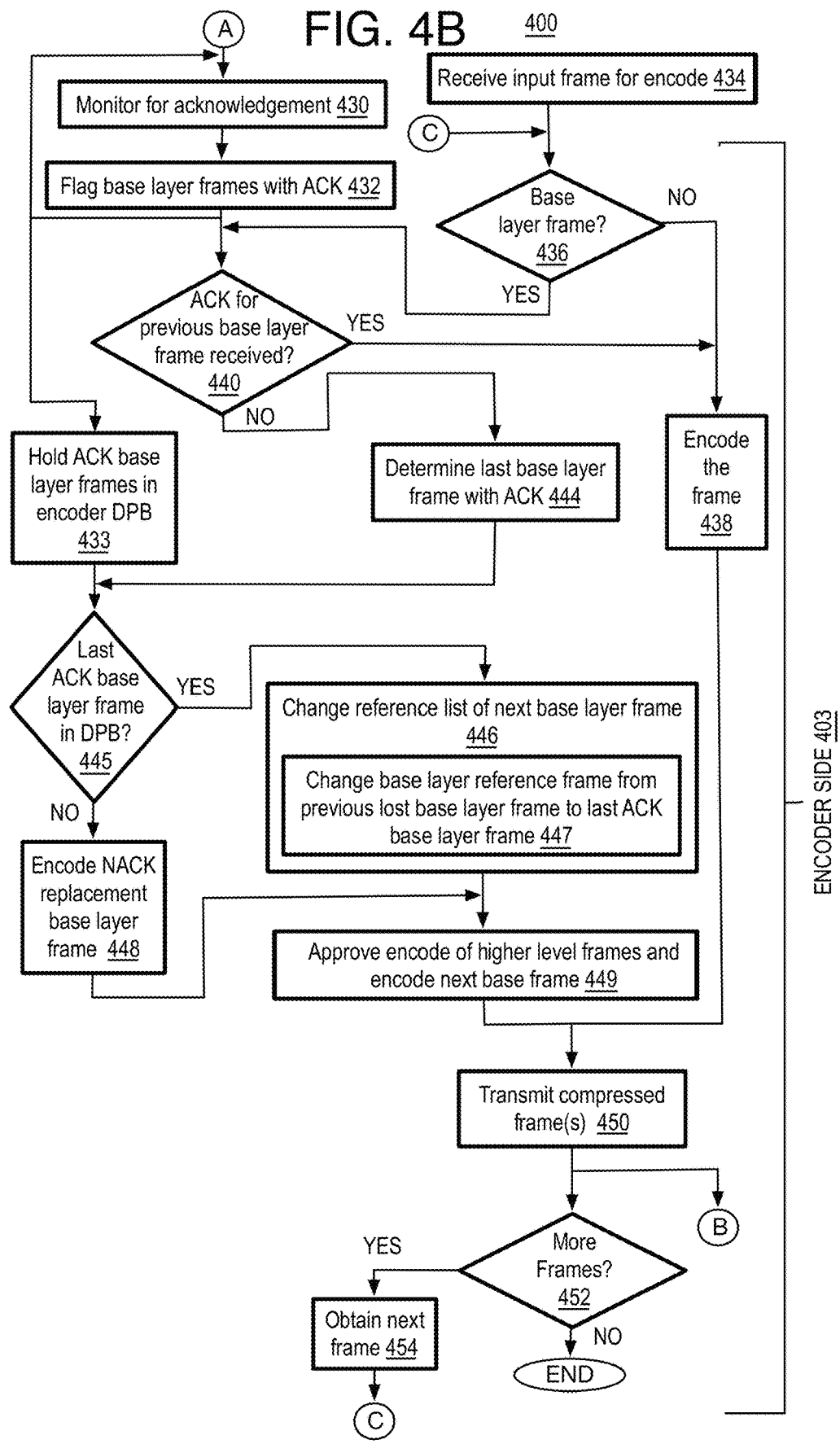

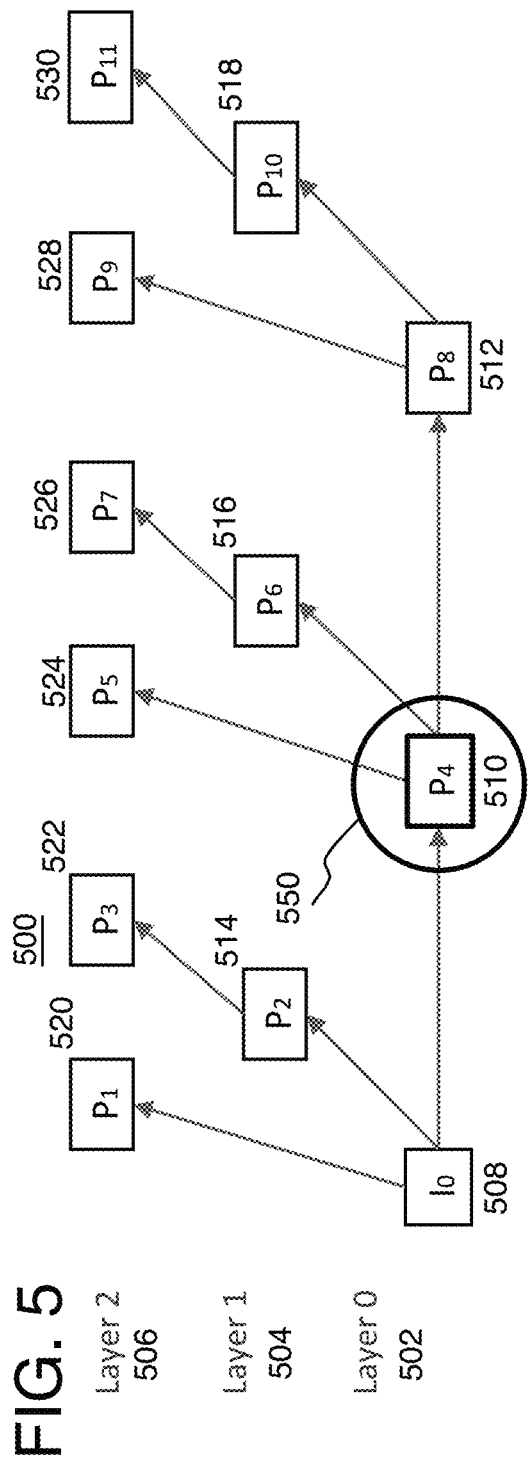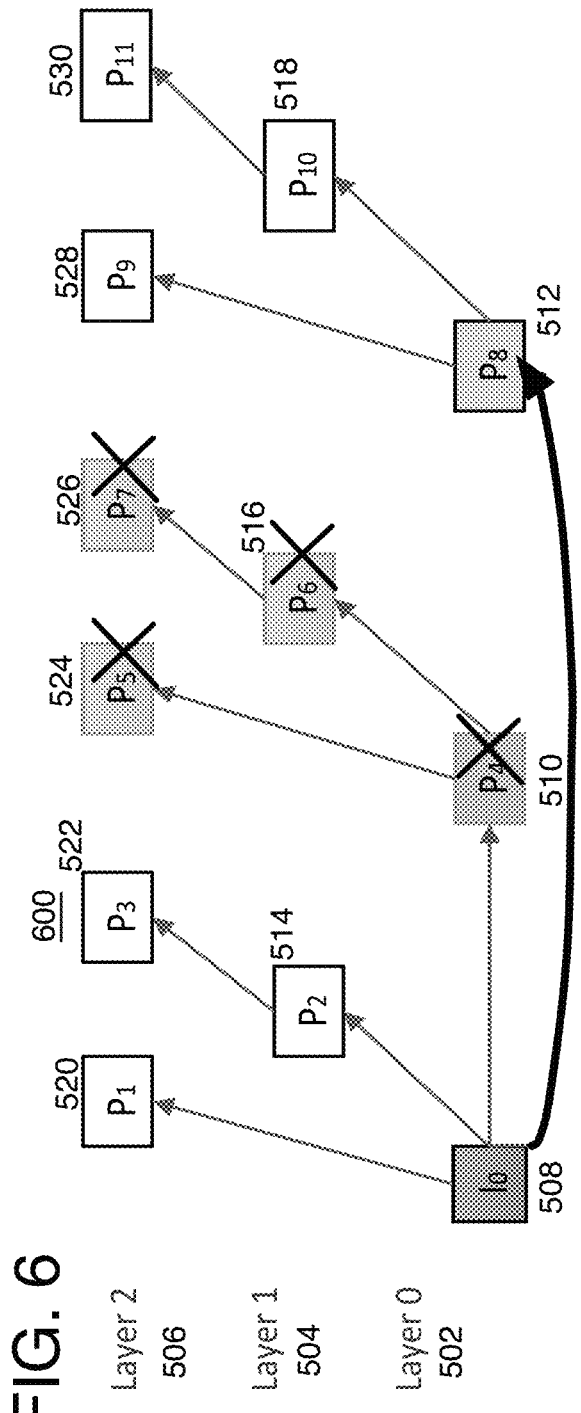
FIG. 5
FIG. 6

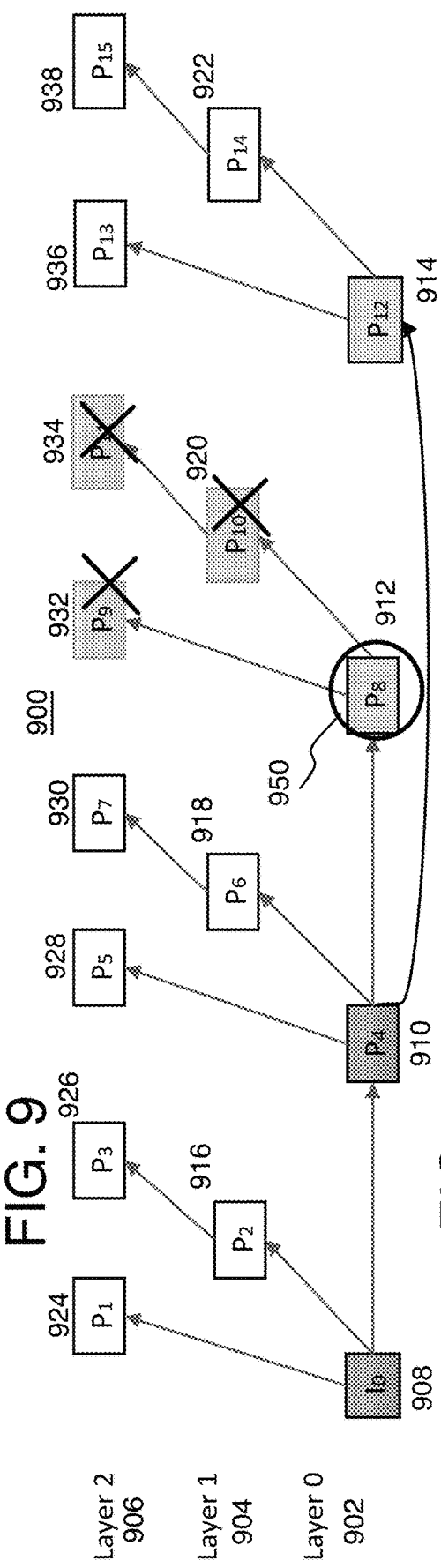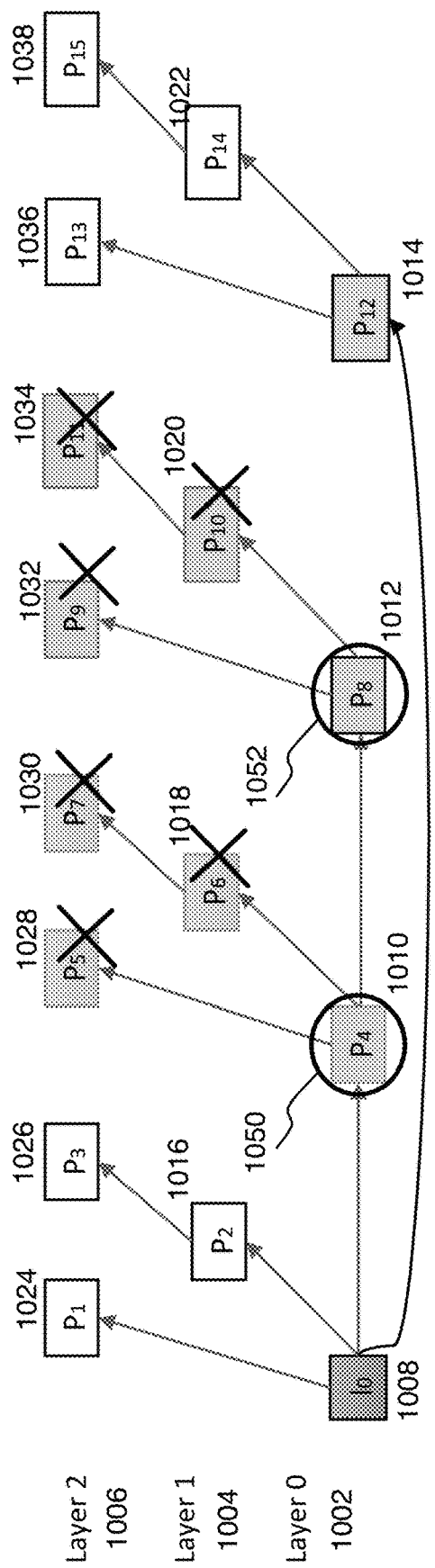

1100

METHOD AND SYSTEM OF VIDEO CODING WITH EFFICIENT FRAME LOSS RECOVERY

BACKGROUND

Video streams may be encoded in order to reduce the image redundancy contained in the video streams, which in turn reduces the required bandwidth of the video streams. An encoder compresses frames of the video streams so that more information can be sent over a given bandwidth or saved in a given file size. An encoding device transmits the compressed frames of the video to a receiver or video decoder that decodes or decompresses the frames for rendering on a display. Video compression typically is performed by using inter-prediction where a current frame is encoded by finding and copying similar content one or more other frames, referred to as reference frames, to reduce unnecessary redundancy and according to a hierarchical structure.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of an example method of video coding with efficient frame loss recovery according to at least one of the implementations herein;

FIG. 3 is another flow chart of an example method of video coding with efficient frame loss recovery according to at least one of the implementations herein;

FIGS. 4A-4B is a flow chart of a detailed example method of video coding with efficient frame loss recovery according to at least one of the implementations herein;

FIG. 5 is a schematic diagram of an example multi-layer video frame sequence hierarchy with a frame loss according to at least one of the implementations herein;

FIG. 6 is a schematic diagram of an example multi-layer video frame sequence hierarchy with partial frame recovery according to at least one of the implementations herein;

FIG. 9 is a schematic diagram of another example multi-layer video frame sequence hierarchy with frame loss and partial frame recovery according to at least one of the implementations herein;

FIG. 10 is a schematic diagram of yet another example multi-layer video frame sequence hierarchy with frame loss and partial frame recovery according to at least one of the implementations herein;

DETAILED DESCRIPTION

Figure 1:
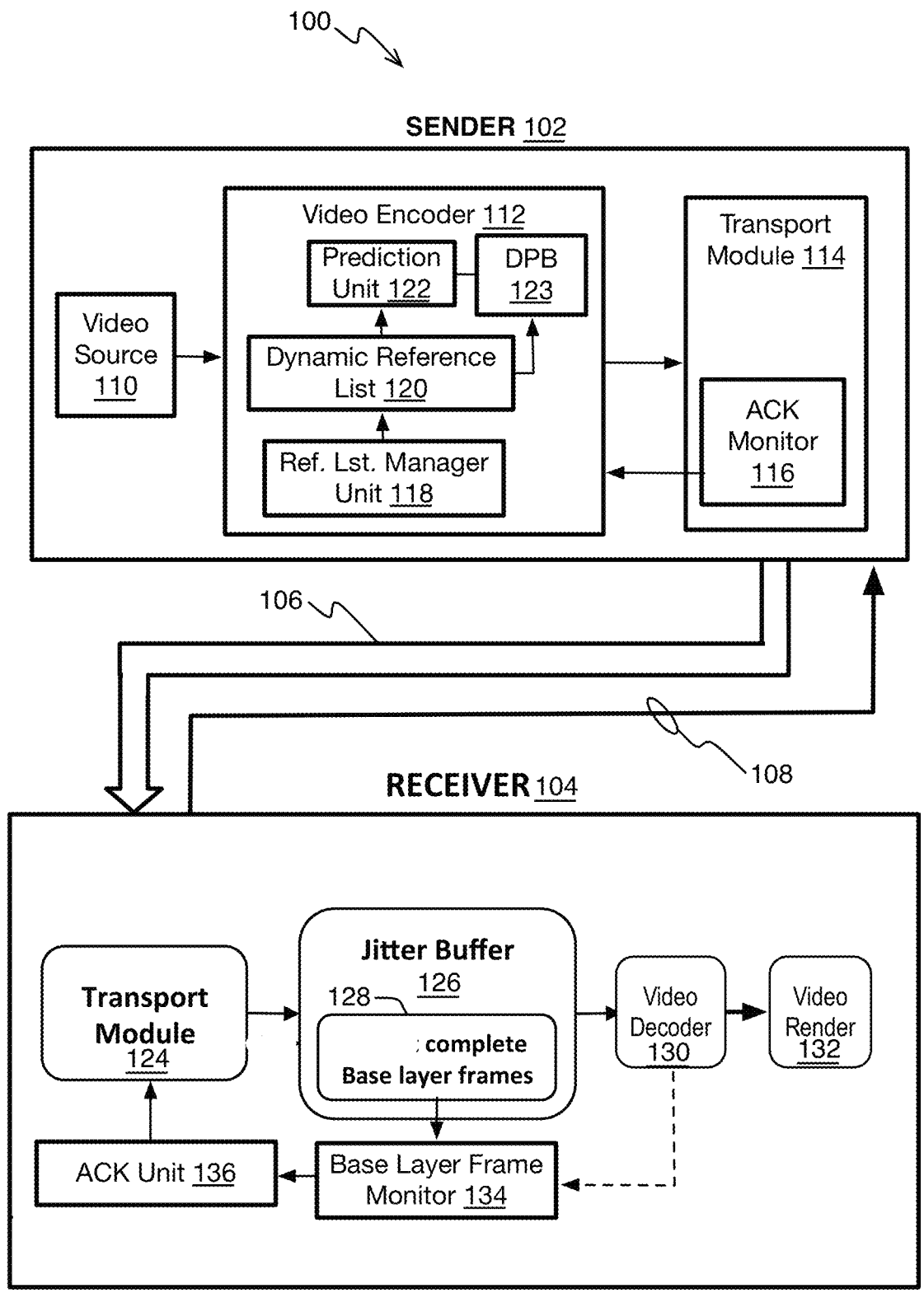
FIG. 1 is a schematic diagram of a video coding system with efficient frame loss recovery according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, tablets, televisions, computers, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as DRAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, systems, computing platforms, and articles described herein are related to video coding with efficient frame loss recovery.

Video Codecs perform inter-prediction by using hierarchal reference frame structures for a variety of reasons. The structures establish dependencies between frames of different layers. Mainly, the hierarchy defines a number of layers including a base layer and higher layers where each layer has some different characterization, such as bitrate, frame rate, and/or visual quality, for example. In some cases, these layers are simply an organization of the priority of the frames where frames on the base layer are the highest priority since base layer frames have intra frames or I-frames (or keyframes) with the most relevant spatial image data and are not constructed from less accurate, higher level reference frames. Also, the base layer may have prediction frames or P-frames that only use other base layer frames as a reference frame.

Higher level P-frames can be used as well as B-frames that use reference frames both ahead and behind the current frame as reference frames and typically occupy the top hierarchy layers when present. Typically, the frames of a higher layer may be encoded based on frames of a lower layer. When the hierarchy layers provide options to enhance the video by using higher layers, the hierarchy is considered a form of temporal scalability where the higher layers are referred to as enhancement layers, and this may be referred to as a scalable video coding (SVC) codec standard where multiple compressed streams each may use different layers that may be provided for decoding.

In either case (whether simply a prioritization hierarchy or temporal scalability), the frame rate of an encoded bit stream may be reduced intentionally by dropping packets, thereby reducing the bitrate of the encoded bit stream via frame thinning. The frame thinning may be performed out of necessity to maintain a bitrate or bandwidth, or to provide increased quality options.

Packet loss and the resulting frame loss is often inevitable due to varying network conditions. In such scenarios, typically, only frames that are decodable are sent for decode. Frames are decodable when the decoder has received all of the previous frames referenced by the frame that is to be decoded, sometimes referred to as the current frame. When the previous frames referenced by the frame that is to be decoded are incomplete at the decoder stack (or buffer), the decoder cannot decode the current frame properly, leading to unacceptable visual artifacts and a poor user experience. In this case, a current frame that depends on the incomplete frames at the decoder as well as further reference frames of the current frame are dropped at the encoder (or sender) and are not sent for decode. Herein, the sender is a device with an encoder that transmits compressed bitstreams to a receiver which is a device, often remote, with a decoder that is separate from the sender, and often remote from the sender.

One conventional way to compensate for dropped packets is to recover lost packets by transmitting a negative acknowledgement request (NACK) from the receiver to the sender. This request informs the sender to re-transmit the lost packets to the receiver. Frame recovery using the NACKs, however, often leads to multiple packet transmission which may consume more network bandwidth on the bitstream being transmitted to the decoder, potentially creating a slower transmission. Waiting for the re-transmitted packet at the decoder to recover a frame also leads to higher latency. In latency sensitive and higher frame rate use cases, such as cloud gaming, such latency is impractical and NACKs are usually disabled to minimize delay and continue processing with a next decodable frame.

Long term reference (LTR) is another technique to attempt to compensate for packet loss and preserves relatively older frames along a video sequence so those older preserved frames can be used as reference frames for future current frames. While the LTR frames can be used to reconstruct a current frame, this does not replace the exact image data of the lost packets and operates on the assumption that the image data did not change significantly from the preserved LTR frame to the actual reference frame that was dropped. Thus, LTR is not suitable for quickly changing dynamic video scenarios such as gaming since scene changes can be very large in this case, and referencing a relatively old frame often leads to a delta or change in image data that is extremely large for the new frames being encoded. This either results in error or substantially increases the frame sizes carrying data representing the change in image data. This again loads the network bandwidth further leading to packet loss and latency issues.

Another frame loss recovery technique is helpful for dyadic hierarchal frame structures. A dyadic hierarchy structure usually has a partial non-linear dependency where multiple frames separately depend from the same previous frame as a reference frame in a dyadic fashion. The dyadic hierarchy can take on many different forms. By one form, each base frame, and additionally P-frames of lower frames, may be a direct reference frame to two higher level frames, each often of a different layer. When one of those two higher level frames are lost, the other higher level frame can still be decoded due to its separate dependency. Difficulties arise with dyadic structure, however, because conventional decoder codec does not know the structure and will drop frames subsequent to a lost frame assuming the dependency is linear. This is overcome by some techniques where the sender may transmit a frame index to the receiver to determine which higher level frames on the dyadic structure can still be decoded when some frames are lost. This helps to minimize the re-transmission requests and continue with available decodable frames.

However, packet or frame loss recovery in a base layer (whether P or I frames (or key frames)) typically is not possible using these techniques due to the reasons mentioned above, and since base layer frames either do not have their own reference frame (as in I-frames) or only have linear prior dependency for the base layer P-frames. Thus, NACK requests for a replacement base layer or instantaneous decoder refresh (IDR) frame whether a key frame (I-frame) or base layer P-frame are necessary. The IDR or replacement base frame is usually large and consumes much of a relatively large network bandwidth. This also can cause delays. Since the receiver waits for this frame, there may be video freezes and higher latency as well. Video streams using linear hierarchy structure suffers with many of these same problems due to the packet loss.

Since the base layer forms 25 to 50% of the number of frames in these hierarchy frame structures as shown in "Table 1" below, it is important to have a mechanism to handle the base layer frame loss.

TABLE 1

Dyadic Hierarchy Frame Distribution

| | Layer | '2' Layer hierarchy | '3' Layer hierarchy |
|---|---|---|---|
| Distribution of frames in each layer | 0 (base) | 50% | 25% |
| | 1 | 50% | 25% |
| | 2 | X | 50% |

To resolve these issues, the disclosed methods dynamically update the frame reference hierarchy on the sender or encoder side by transmitting acknowledgements from the receiver to the sender each time the receiver or decoder side determines a base layer frame can be decoded without significant (or any) packet drops, and the frame will not be dropped (or lost). The acknowledgement can be sent from the receiver back to the sender on a feedback channel. When no acknowledgement is received, the sender will transmit the next base layer frame and its higher layer frames (if that next base layer frame does not become lost itself). The next base layer frame, if a base layer P-frame, will have its reference structure, and in turn its reference list, updated to be able to use the last acknowledged base layer frame as a reference frame.

Figure 11:
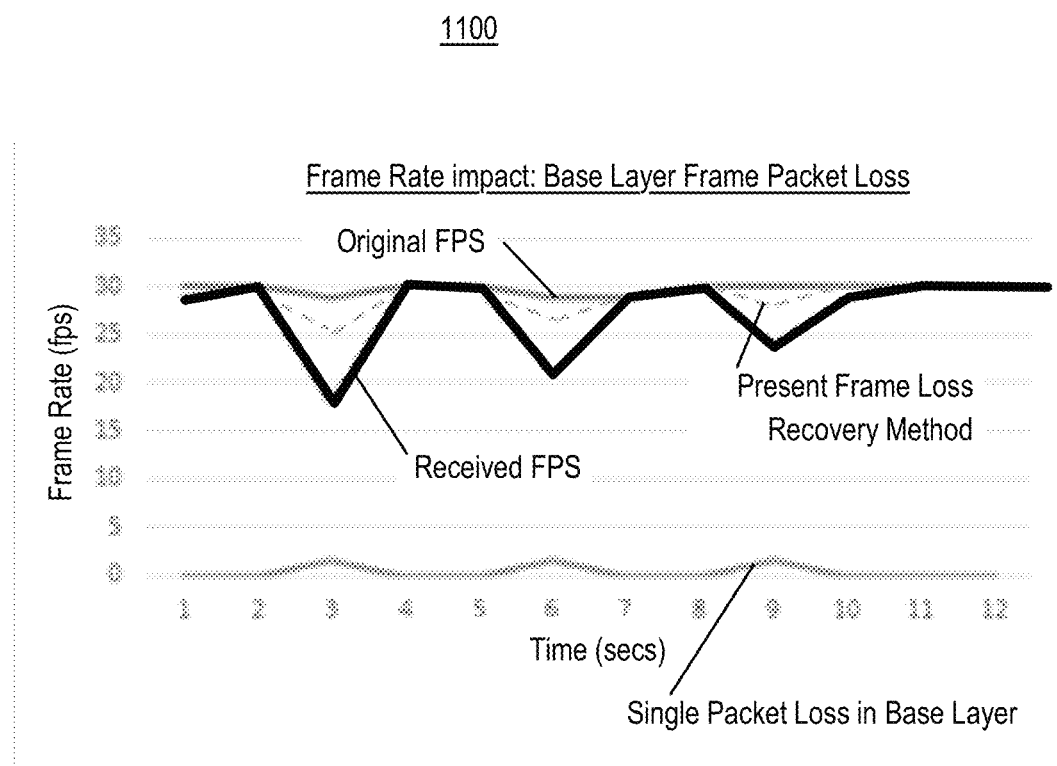
FIG. 11 is graph showing video coding frame rates with frame packet losses.

The ability to use the last acknowledged base layer frame as a reference frame for a next base layer frame, thereby saving the higher level frames depending on the next base layer frame, permits the performance of real time lost frame recovery that increases quality without causing further latency. Specifically, this arrangement provides a better user experience since it improves video smoothness by avoiding video freezes due to key frame requests and resulting large bandwidth key frame transmissions. Also, this arrangement avoids further network congestion in lossy network conditions for low latency video streaming usages. Further, frame rates also will be improved in lossy conditions by avoiding frame losses at the base layer. Improvement in frame rate is shown in FIG. 11 and discussed in greater detail below.

Referring now to FIG. 1, a video coding system 100 may be used to perform the implementations herein. The system 100 may include a sender (or sender device) 102 that has an encoder 112, and a receiver (or receiver device) 104 that has a decoder 130. The sender 102 also has a video source 110 that receives video downloaded from other remote devices over wired or wireless computer or communications networks, such as WiFi, Bluetooth®, and so forth, from an external or internal memory, or directly as raw data from cameras. The video, in the form of video frame sequences, then may be provided to the encoder 112 that compresses the video for transmission.

The encoder 112 performs the encoding in compliance with codecs such as H.264/AVC as an exemplary video coding standard. However, various video standards may be used according to the present techniques. Exemplary standards include the H.264/MPEG-4 Advanced Video Coding (AVC) standard, High Efficiency Video Coding (HEVC) standard, and VP9 standard to name a few examples. The encoder 112 is not limited to a particular codec as long as the encoder uses inter-prediction at a prediction unit 122 for example and that uses multi-layer reference structures as described herein. The encoder 112 may provide compressed frames to a transport module 114 that packages the compressed frames into packets as well as accompanying overhead data such as frame identification, reference lists, and at least data sufficient to perform the inter-prediction such as motion vectors, frame type, and so forth. The transport module 114 then may place the packets in form for transmission and transmit the packets in a bitstream 106. The video coding bitstream 106 may be transmitted over a computer or other communications network such as WiFi or others. It will be appreciated that when one unit provides data to another unit, this may simply refer to that data being accessible in a memory to the receiving unit.

The sender 102 also receives acknowledgements on a feedback channel 108. The feedback channel 108 may be a separate dedicated data channel such as on WiFi or internet, and may be transmitted over other computer networks. Other details are provided below.

The sender 102 may have an acknowledgement (ACK) monitor unit 116 that examines the feedback signal for acknowledgements. The ACK monitor unit may receive a two-byte code as the ACK, and provide identification of the frame such as by frame timestamp (TS) or picture ID to name a few examples, to the encoder to indicate whether an ACK was received or not for each base layer frame transmitted. When an ACK is not received for a base layer frame, thereby indicating a base layer frame was dropped (or lost), the encoder 112 then may perform updating. In this case, the encoder's reference list manager (or dynamic reference list manager) 118 may determine which frames are to be on the reference list. By one form, the reference list manager 118 uses a specific temporal hierarchy (such as DYADIC) for the encoded video frames (shown in detail below such as with FIG. 5), but other multi-layer reference frame structures could be used instead. By using the hierarchy structure, the reference list manager 118 can change the reference list of a next base layer frame to depend on an already acknowledged base layer frame, when initially depending from a lost or dropped base layer frame. This recovers the next base layer frame, and its dependent higher layer frames, from being dropped due to the lost base layer frame.

Accordingly, the reference list manager 118 then may instruct a dynamic reference list unit 120 to retrieve a next base layer frame and its higher level frames to be transmitted. The dynamic reference list unit 120 places the retrieved reference frames in decoded picture buffer 123 of the encoder, or more specifically the encoder decoding loop frame buffer, by using the reference list so that the reference frames can be used by the prediction unit 122 to generate residuals to be compressed and transmitted. The updated reference list of individual frames also is transmitted to the decoder with the frame headers parsed and used at the decoder.

The receiver 104 receives the bitstream of compressed video frames at a transport module 124 and provides the frames to a buffer 126, such as a jitter buffer. The buffer 126 may hold all frames for decoding including base layer frames whether the frames are complete, or have some portions missing. The frames that are sufficiently complete for decoding are passed to the decoder 130 which decompresses the frames for rendering 132 or storage for subsequent transmission, later rendering, or analysis of the content of the images by other applications (such as object segmentation, 3D modeling, and so forth).

A base layer frame monitor 134 determines if the base layer frames are complete 128. By one form, this may include determining if any packets are missing from a frame. Those frames with a sufficient number of packets (which may be all) are considered complete. The base layer frame monitor 134 may provide an indicator that a frame is complete to an acknowledgement unit 136. The acknowledgement unit 136 then formats the acknowledgement and has it transmitted by the transport module 124 and out on the feedback channel 108. Many more details of the operation of system 100 are provided below.

Figure 12:
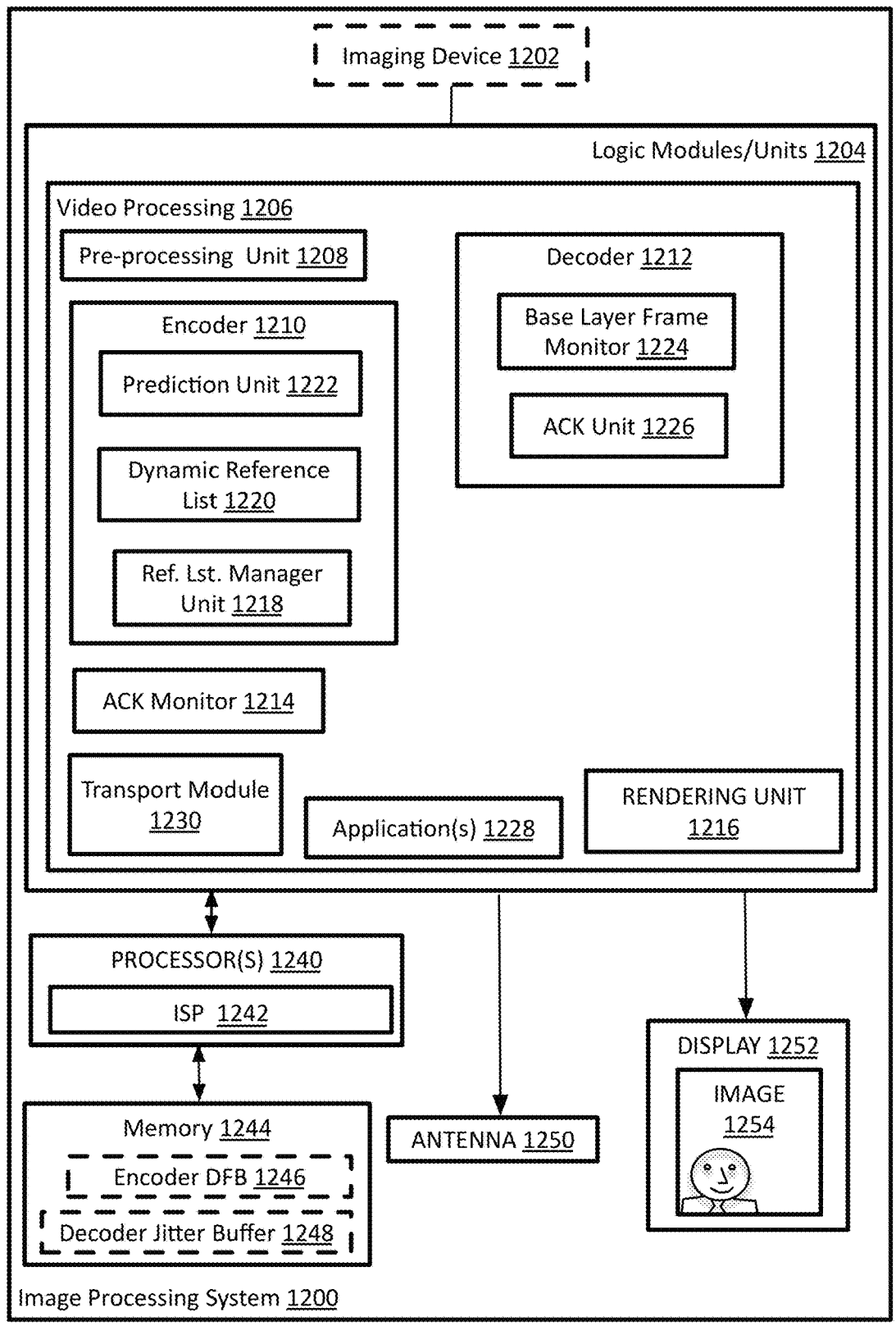
FIG. 12 is an illustrative diagram of an example system.

Referring to FIG. 2, an example process 200 for a method of video coding with efficient lost frame recovery, and particularly from the perspective of the sender side, is arranged in accordance with at least some implementations of the present disclosure. Process 200 may include one or more operations 202-206 numbered evenly. Process 200 may form at least part of a video coding process. By way of non-limiting example, process 200 may perform a coding process as performed by any device or system as discussed herein such as system or device 100 or 1200 (FIG. 1 or 12 respectively).

Process 200 may include "obtain input frames of a video sequence to be compressed" 202. This may include video streamed from remote devices, video obtained from a local or external memory, or raw video from one or more remote or on-board cameras for example, and to be encoded for transmission to a remote or separate decoder. The image data of the frames may be in any color scheme format whether RGB, YUV, and so forth, thereby providing appropriate chroma and luminance pixel image data, and may be pre-processed sufficiently for encoding. The frames may be provided in display order and then re-arranged to coding order for compression operations by the encoder where reference frames of a current frame are encoded before the current frame is encoded.

Process 200 may include "receive acknowledgement messages that acknowledge an individual base layer frame of a multi-layer inter-prediction reference frame structure has sufficient data to be decoded" 204. This operation may include monitoring a feedback channel providing the acknowledgements to discover which base layer frames are to be used for decoding and which base layer frames are to be dropped at a decoder device. The acknowledgement of an individual base layer frame should be performed in time to change the reference list of a next base layer frame when the individual base layer is dropped or lost at a receiving device or decoder. The decoder also will drop the higher layer frames that depend from the lost base layer frame.

Process 200 may include "update the inter-prediction reference frame structure to be used to encode the input frames depending on whether or not the individual base layer frame has the acknowledgment" 206. The updating may include changing a base layer reference frame of a next base layer frame from a previous base layer reference frame without an acknowledgement to a base layer reference frame with the acknowledgement. The updating also may include encoding non-base layer frames that directly or indirectly reference the next base layer frame.

To accomplish this updating, the updating may comprise holding one or more base layer frames with acknowledgments in an encoder multi-frame decoded picture frame buffer and for a sufficient duration to use the one or more base layer frames as a reference frame for at least one subsequent base layer frame that is encoded after at least one base layer frame without an acknowledgement. This is only limited by the size of the buffer which may depend on the encoder used or other applications controlling the encoder DPB. By one form, a negative acknowledgement (NACK) operation that generates a replacement base layer frame may be performed when no acknowledged base layer frames exist in the multi-frame encoder decoded picture buffer.

Referring to FIG. 3, an example process 300 for a method of video coding with efficient lost frame recovery, and particularly from the perspective of the receiver side, is arranged in accordance with at least some implementations of the present disclosure. Process 300 may include one or more operations 302-306 numbered evenly. Process 300 may form at least part of a video coding process. By way of non-limiting example, process 300 may perform a coding process as performed by any device or system as discussed herein such as system or device 100 or 1200 (FIG. 1 or 12 respectively).

Process 300 may include "obtain compressed frames of a video sequence" 302, and here, compressed frames are received in a bitstream from an encoder, extracted, and placed in a buffer, such as a jitter buffer of a decoder.

Process 300 may include "determine whether a compressed frame of the video sequence that is a base layer frame of a multi-layer inter-prediction reference frame structure has sufficient data to be decoded" 304. In this case, the jitter buffer or other buffer receiving the compressed frames is monitored, and it is determined whether or not a frame is missing a minimum sufficient number of packets so that the frame can be decoded. By one form, a frame is considered complete and can be decoded as long as no packets are missing or incomplete.

Process 300 may include "transmit an acknowledgement message when an individual base layer frame has sufficient data to be decoded, and omit the transmission of the acknowledgement when the individual frame does not have sufficient data" 306. The acknowledgement message should be transmitted in time so that an encoder can transmit a revised reference list of a next base layer frame and back to a decoder associated with the acknowledgements in order to decode the next base layer frame. By one form, the transmission is on a dedicated data feedback channel. By one form, the message is a two-byte code, or any other adequate size, with a frame timestamp, picture ID, or both. When the individual base layer frame is missing or not complete at the receiver or decoder (or decoder associated buffer such as a jitter buffer), the decoder will omit the massage to that the encoder will assume this frame is missing (whether lost or dropped) at the decoder.

Figure 4A:
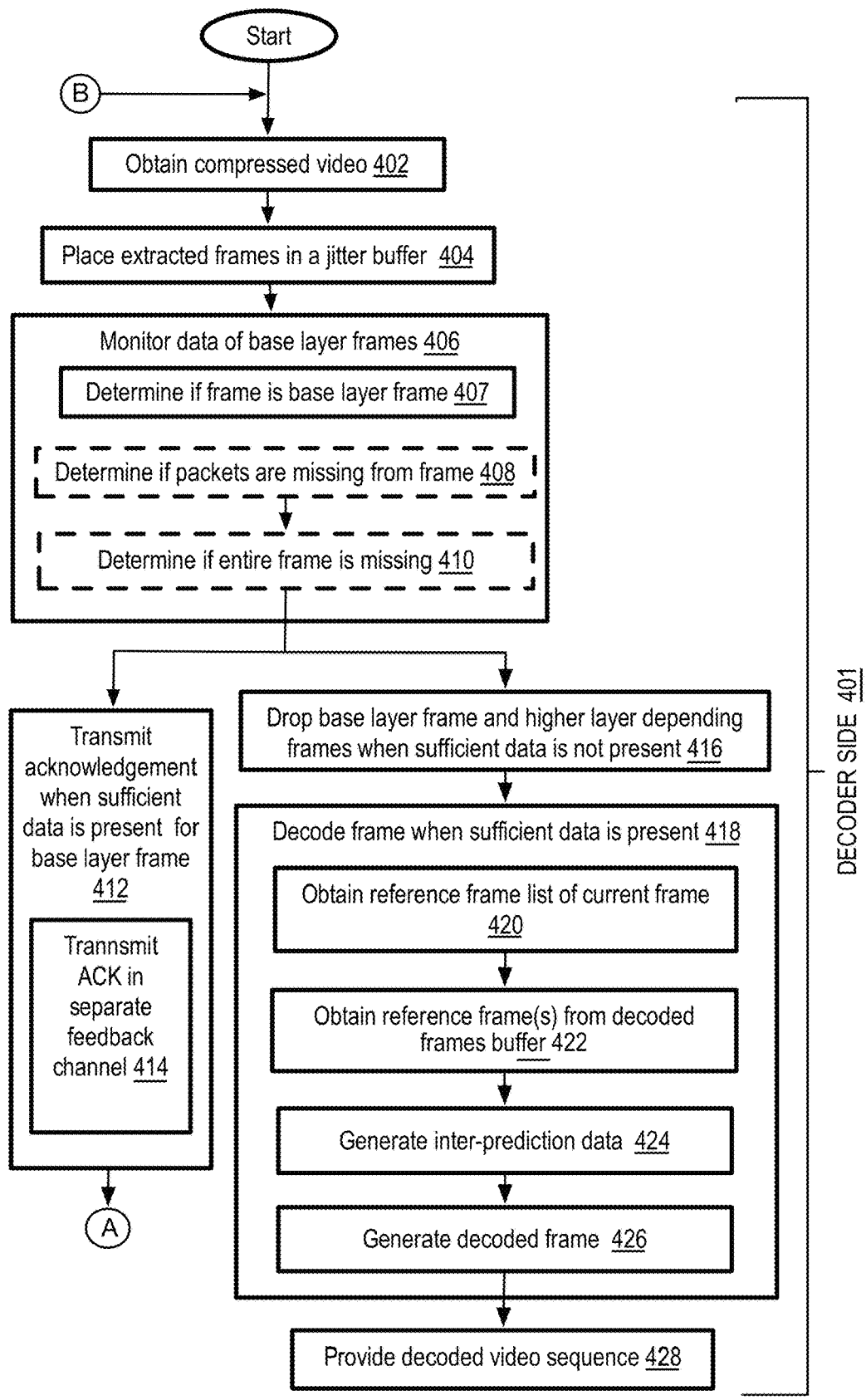

Referring to FIGS. 4A-4B, an example process 400 for video coding is arranged in accordance with at least some implementations of the present disclosure. Process 400 may include one or more operations 402-454 generally numbered evenly. By way of non-limiting example, process 400 may perform a coding process as performed by any device or system as discussed herein such as system 100 or system or device 1200 (FIGS. 1 and 12 respectively), and may be described by referring to those systems. Process 400 also is described with reference to example multi-layer inter-prediction reference frame structures 500, 600, 700, 800, 900, and 1000 (FIGS. 5 to 10 respectively) below.

The process 400 has a decoder (or receiver) side 401 and an encoder (or sender) side 403. It will be understood that process 400 operates in a loop once compressed frames from an encoder reach the decoder (and acknowledgements are sent back to the encoder to close the loop), and until the last frame of a video sequence is decoded. Process 400 below starts with the explanation of the receiver or decoder side 401 since this side triggers the updating of the encoder side 403.

Process 400 may include "obtain compressed video" 402, and as described above, extracted from a bitstream of compressed frames as well as overhead including frame types, a reference list for each frame, and so forth.

Process 400 may include "place extracted frames in a jitter buffer" 404, where the individual extracted frames are placed to await decoding.

Referring to FIG. 5, process 400 may include "monitor data of base layer frames" 406. In other words, the encoder may use a multi-layer reference frame structure with base layers and higher level layers that may have different characteristics such as bitrate or frame rate. A sample multi-layer reference frame structure 500 is used to demonstrate the method of frame recovery herein and to explain base layer frames. The structure 500 may be a three layer structure, although many different layers may form the structure. In this example, structure 500 has a base layer 502, a middle layer 504, and an upper layer 506 where layers 504 and 506 form the non-base layers or the higher layers. The structure may be a twelve frame IPPPPPPPPPPP group of pictures (GOP) where this pattern repeats each 12 frames although many other GOP patterns may be used instead. Here, the frames of the structure 500 are to be encoded in order by frame number from key frame $I_0$ to frame $P_{11}$, and according to the reference frame dependency that is shown.

Specifically, in this dyadic structure, the base layer 502 has base layer frames including a base layer key-frame or I-frame $I_0$ 508 that does not have any of its own reference frames by definition, and base layer P-frames $P_4$ 510 and $P_8$ 512 that each linearly use the previous base layer frame as a reference frame. The middle layer 1 504 has frames $P_2$ 514, $P_6$ 516 and $P_{10}$ 518 that each depend from a frame on the lower base layer 502. The upper layer 506 has frames $P_1$ 520, $P_3$ 522, $P_5$ 524, $P_7$ 526, $P_9$ 528, and $P_{11}$ 530, where the frames $P_1$ 520, $P_5$ 524, and $P_9$ 528 directly reference the base layer frames, and $P_{11}$ 530, $P_3$ 522, and $P_7$ 526 each reference a middle layer frame instead. In this case, the decoder will monitor the condition of the base layer frames $I_0$ 508, $P_4$ 510, and $P_8$ 512 to provide acknowledgements.

The monitor of the jitter buffer is able to determine which frames are base layer frames because the frame order is either already known by the decoder or is informed by the real-time transport protocol transmitted by the encoder or the overhead data of the video sequence, frames, of other partitions such as slices or blocks of the frame. The RTP may include frame timestamps (TSs), packet sequence numbers, marker bits, and so forth. The base layer frames are the I-frames and the P-frames in a certain order after the I-frames, such as every four frame intervals after the I-frame and in the layer structure 500 by one example.

Process 400 may include "determine if packets are missing from frame" 408. Usually, only a few packets of a frame will be lost or incomplete. This can be determined by using the RTP the sequence numbers, marker bit, and timestamps. For example, a marker bit with timestamp (TS0) and Seq Num #'x' is the last packet of a frame. The next frame starts from RTP packet holding Seq Num #'x+1'. The next frame timestamp (TS1) also will have a different time stamp than the previous frame (TS0). If there is any gap in sequence number before the marker bit is read, this indicates one or more packets of the frame are missing.

Process 400 may include "determine if entire frame is missing" 410. The jitter buffer may have a fixed or adjustable frame capacity in order to meet adjusting bitrate requirements between encoder and decoder, and may drop frames merely to meet bitrate demands. In some forms, the jitter buffer, or more particularly a manager of the buffer, can control the frame type and GOP position of the frame that is being retrieved from the buffer for decoding. Thus, while the absence of an entire frame also can be determined by checking the marker bit and continuity of next frame sequence numbers, the jitter buffer most likely is already using ordering mechanisms to determine which frames are missing (referring to completely lost or just incomplete and to be dropped) and received so that it can check for the frame decodable continuity.

Process 400 may include "transmit acknowledgement when sufficient data is present for base layer frame" 412. By one form, the acknowledgement (ACK) is sent when all packets of a frame are present on a frame at the jitter buffer. When any packets are missing, even one, the frame is dropped. Other criteria could be used instead by experimenting with a minimum number of packets that could be lost and still have a frame decoded with sufficient quality. When an entire frame is missing, the frame is considered lost. When the frame is complete, the decoder, or acknowledgement unit, will send an ACK back to the encoder.

Process 400 may include "transmit ACK in separate feedback channel" 414. By one form, the ACK is sent on a dedicated data feedback channel over WiFi, such as by using transmission control protocol (TCP) or user datagram protocol (UDP). By one form, the ACK may be two bytes, and the receipt of which represents the acknowledgement. By one form, the ACK may hold a unique reference to the base layer frame, such as a frame time stamp (TS), or could also use a picture ID. Other identifiers could be used as well. The channel may be a dedicated data channel only for decoder feedback.

The feedback channel has been tested with a spectrum of channel types with varying levels of reliability, and no significant variation in resulting latency has been found. The feedback ACK should be received in time for an encoder to change the actual multi-layer structure, and in turn a reference list, for a next base layer frame to be decoded after finding a dropped or missing frame at the decoder's buffer. With a three-layer dyadic hierarchy, below are the example timelines to receive the feedback in time for decoding the next base layer frame. The time is measured from detecting a base layer frame that is dropped to the time a next base layer frame is to be decoded in a GOP at the decoder, and with a four hierarchy sequence, as with the GOP of structure 500. The time can be considered the time to display (i.e., frame rate) three frames:

TABLE 2

Base Layer feedback timelines

| Number of Frames in Hierarchy sequence | Max feedback time 30 fps | Max feedback time 60 fps |
|---|---|---|
| 4 | (3 * 33) = ~100 msec | (3 * 16) = ~50 msec |

As profiled in 60 fps cloud gaming solutions, feedback can be received in about two frame intervals in general Wi-Fi network conditions, which is about 32 msec. In very good network conditions, feedback can be received in 16 msec. It will be appreciated that the transport mechanism can be via other communication networks other than WiFi as well.

Process 400 may include "drop base layer frame and higher layer depending frames when sufficient data is not present" 416, and this is as explained in operation 406 where an incomplete base layer frame is detected and an acknowledgement is sent out. Here, the data of the incomplete base layer frame, as well as its higher layer frames that use the incomplete base layer frame as a reference frame, is actually removed from the jitter buffer. Referring to FIGS. 5-6 for example, now say that base layer frame $P_8$ 512 is the current frame, base layer frame $P_4$ 510 is the lost frame 550, and base layer frame $I_0$ 508 was previously placed in the encoder DPB as the last acknowledged frame on the base layer. In this case, higher level frames $P_5$ 524, $P_6$ 516, and $P_7$ 526 that depend on lost frame $P_4$ 510 as a reference frame also will be dropped from the jitter buffer since the reference data for those frames is missing. This is shown on structure 600 which is a later version of structure 500. Thus, in this case, those dropped frames will not be decoded.

Process 400 may include "decode frame when sufficient data is present" 418, and merely provides the operations for decoding such as "obtain reference frame list of current frame" 420, and this is the reference frame whether originally provided by the encoder or as updated by the encoder due to the ACK. In accordance with the reference list, then, process 400 may include "obtain reference frame(s) from decoded frames buffer" 422 (or decoded picture buffer (DPB) of the decoder) and again according to the original or updated reference list. Next, the process 400 may include "generate inter-prediction data" 424, and as per any decoding techniques used for inter-prediction at a decoder. Process 400 then may include "generate decoded frame" 426 where the prediction is used to reconstruct the frame.

Process 400 may include "provide decoded video sequence" 428, where the decoded sequence is provided for rendering, storage, re-transmission by an encoder, or for analysis such as with object segmentation, 3D reconstruction, and many other applications.

Turning now to the sender or encoder side 403, and to continue the process from the decoder side 401, the process 400 may include "monitor for acknowledgement" 430, where the feedback signal is monitored and read. The feedback message may have identification of the frame by picture ID or timestamp TS for example. Once the frame is identified, process 400 may include "flag base layer frames with ACK" 432, where some indicator is attached to the frame overhead data, or may be provided on a table listing acknowledged frame timestamps for example.

Process 400 may include "hold ACK base layer frames in encoder DPB" 433. Once an acknowledged base layer frame is placed in the encoder decoded picture buffer (DPB) according to a reference list of a current frame, the encoder or buffer manager will keep that base layer frame in the buffer as long as possible, or at least as long as it is efficient and can be used as a reference frame for at least one other base layer frame after a dropped base layer frame. The capacity of the buffer will depend on the type of encoder and/or applications that can control the encoder for particular use cases, such as the type of video, or the purpose of the video, such as gaming with fast action. To this end, the encoder decoded picture buffer (DPB) can be configured to hold some minimum number 'x' of the acknowledged base layer frames (in addition to the higher level reference frames). When the buffer has its capacity of acknowledged base layer frames, they may be moved in and out of the buffer in first-in, first out (FIFO) fashion by one example.

In the case of a three layer hierarchy as on structure 500, only the base layer frames and the middle layer frame can be used as reference frames. Thus, an encoder DPB may be sized to hold three base layer frames such as base layer frames $I_0$ 508, $P_4$ 510, and $P_8$ 512, even after frames $P_2$ to $P_3$, $P_5$ to $P_7$, and $P_9$ to $P_{11}$ have already been encoded.

Also at the encoder side 403, the process 400 separately starts with "receive input frame for encode" 434, and as already described with operation 202 where frames of a video sequence are obtained or formatted to have parameter such as resolution, color scheme, and so forth expected by the encoder.

Process 400 may include the inquiry "base layer frame?" 436, where the encoder assigns frame types according to the multi-layer frame structure being used, and therefore assigns which frames are to be base layer frames. As mentioned with the dyadic structure 500 and using a twelve frame GOP IPPPPPPPPPPPP, the base layer frames are every fourth frame after the first key frame. This includes frames $I_0$ 508, $P_4$ 510, and $P_8$ 512 for example structure 500. If the current frame being encoded is not a base layer frame, process 400 may include "encode the frame" 438 as per usual encoding process, and the compressed frame is then transmitted 450.

When the current frame to be encoded is a base layer frame, the process 400 may include the inquiry "ACK for previous base layer frame received?" 440. Thus, for structure 500 example, if frame $P_4$ 510 is the current frame, this inquiry is whether frame $I_0$ 508 was acknowledged. If the previous frame was found to be acknowledged by operations 430 and 432 described above, then the current frame is encoded 438 as usual. The decoder side will subsequently report whether that current frame is received intact for decoding.

When the previous frame is not acknowledged, it is assumed that the previous frame is missing (it is lost or dropped). In this case, process 400 enters into a number of operations to update the multi-layer structure to recover frames that would otherwise also be dropped due to the reference frame dependencies in the original multi-layer frame structure.

Process 400 also may include "determine last base layer frame with ACK" 444 as part of the updating of the multi-layer structure. Here, the sender or encoder determines if the next base layer frame $P_8$ 512 on structure 600 also can be recovered and encoded saved by changing its reference frame from the lost base layer frame to the last acknowledged base layer frame. Thus, the last base layer frame with an acknowledgment is determined, either by looking it up on a table, looking for a flag or indicator on the frame-level data, or simply by its presence in the encoder DPB.

Once it is determined which frame is the last base layer frame acknowledged, process 400 may include the inquiry "last ACK base layer frame in DPB?" 445, and if not already evident by looking for the frame in the first place. Also, it should be noted that the new reference frame for the current base layer frame need not always be the last acknowledged base layer frame when multiple acknowledged base layer frames are available in the encoder DPB. In that case, there may be a criteria to choose which acknowledged last base layer frame to use as a reference frame, such as whether the ACK base layer frame in the encoder DPB is an I-frame or a P-frame while still being sufficiently close in base layer position to the next base layer frame.

Process 400 then may include "change reference list of next base layer frame" 446, and by the reference list manager (or dynamic reference list handler) by some examples. This operation may include "change base reference frame from previous lost base layer frame to last ACK base layer frame" 447, where lost here refers to a frame missing for any reason mentioned herein. With this change, the current (or next) base layer frame still can be decoded because it now has an acknowledged reference frame.

To continue the example of structure 600, this operation refers to changing the reference frame of $P_8$ 512 from the original dyadic hierarchy that provides frame $P_4$ 510 as the reference frame, which is now lost or dropped, and changes the reference frame to the last acknowledged base layer frame, which is frame $I_0$ 508. Since the base layer frame $P_8$ 512 is recovered, higher layer frames $P_9$ 528, $P_{10}$ 518, and $P_{11}$ 530 now also can be decoded, and will be compressed and transmitted from the encoder. The updated reference list of the next base layer frame $P_8$ 512 will be transmitted to the decoder as well to provide the correct updated reference frame dependencies. Without this change or updating, frames $P_8$ to $P_{11}$ also would be dropped due to the missing reference image data by losing base layer frame $P_4$ 510

On the other hand, when no previously (or last) acknowledged base layer frame is in the encoder DPB, process 400 may include "encode NACK replacement base layer frame" 448. In most cases, this may occur when many base layer frames are lost. Here then, the fallback mechanism is to re-generate the lost base layer frame. This may include determining which packets to resend from an RTP transport module for example which may or may not be separate from the encoder, and which usually stores and maintains a history of packets that it has sent from the encoder. This also depends on the application that is using the encoder, and how the RTP is configured, which may control how many RTP packets can be held in a history for NACK purposes. Since real world network congestion happens intermittently and usually recovers, in most cases, the proposed solution would significantly reduce the amount of these NACK key frame requests and transmissions.

In either case, whether updating the reference list or using a NACK replacement, process 400 may include "approve encode of higher level frames and encode next base frame" 449 so that the next base layer frame is now compressed and its higher level frames are approved for encoding rather than being dropped at the encoder, and process 400 may include "transmit compressed frame(s)" 450 for any of the compressed frames mentioned here.

Process 400 next may include the inquiry "more frames?" 452, to determine if the end of the video sequence has been reached. If not, process 400 may include "obtain next frame" 454 and loops back to operation 436 to being the sender side process again. If so, the process ends.

Referring to FIGS. 7-10, other examples are provided that show a variety of instances applying the present methods described above, and depending on the DPB size configured and base layer frame ACK received.

Figure 7:
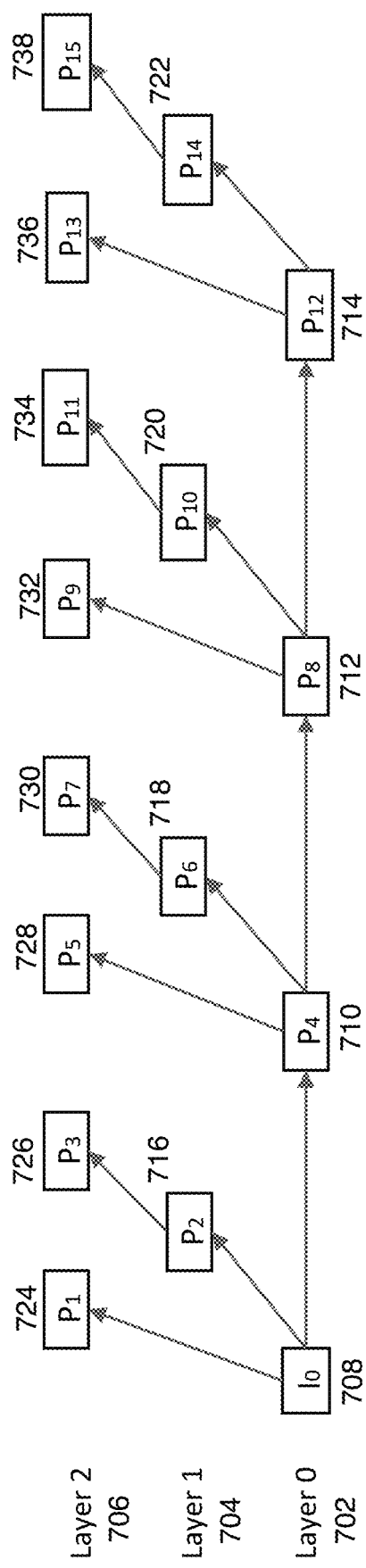
FIG. 7 is a schematic diagram of another example multi-layer video frame sequence hierarchy according to at least one of the implementations herein.

Referring to FIG. 7, a multi-layer reference frame structure 700 has a sixteen frame GOP pattern where all the frames are P-frames except the first frame which is an I-frame. The pattern repeats each 16 frames although many other GOP patterns may be used instead. This same pattern is used for the example reference frame structures of FIGS. 8-10. Here, the frames of the structure 700 are to be encoded in order by frame number from frame $I_0$ 708 to frame $P_{15}$ 738, and according to the reference frame dependency that is shown.

Specifically, in this dyadic structure, the base layer 702 has base layer frames including a base layer key-frame or I-frame $I_0$ 708 that does not have any of its own reference frames by definition, and base layer P-frames $P_4$ 710, $P_8$ 712, and $P_{12}$ 714 that each linearly use the previous base layer frame as a reference frame. The middle layer 1 704 has frames $P_2$ 716, $P_6$ 718, $P_{10}$ 720, and $P_{10}$ 722 that each depend from a frame on the lower base layer 702. The upper layer 706 has frames $P_1$ 724, $P_3$ 726, $P_5$ 728, $P_7$ 730, $P_9$ 732, $P_{11}$ 734, $P_{13}$ 736, and $P_{15}$ 734, where the frames $P_1$ 724, $P_5$ 728, $P_9$ 732, and $P_{13}$ 736 directly reference the base layer frames, and $P_3$ 726, $P_7$ 730, $P_{11}$ 734 and $P_{15}$ 738 each reference a middle layer frame instead. In this case, the decoder will monitor the condition of the base layer frames $I_0$ 708, $P_4$ 710, $P_8$ 712, and $P_{12}$ 714 to transmit acknowledgements.

Figure 8:
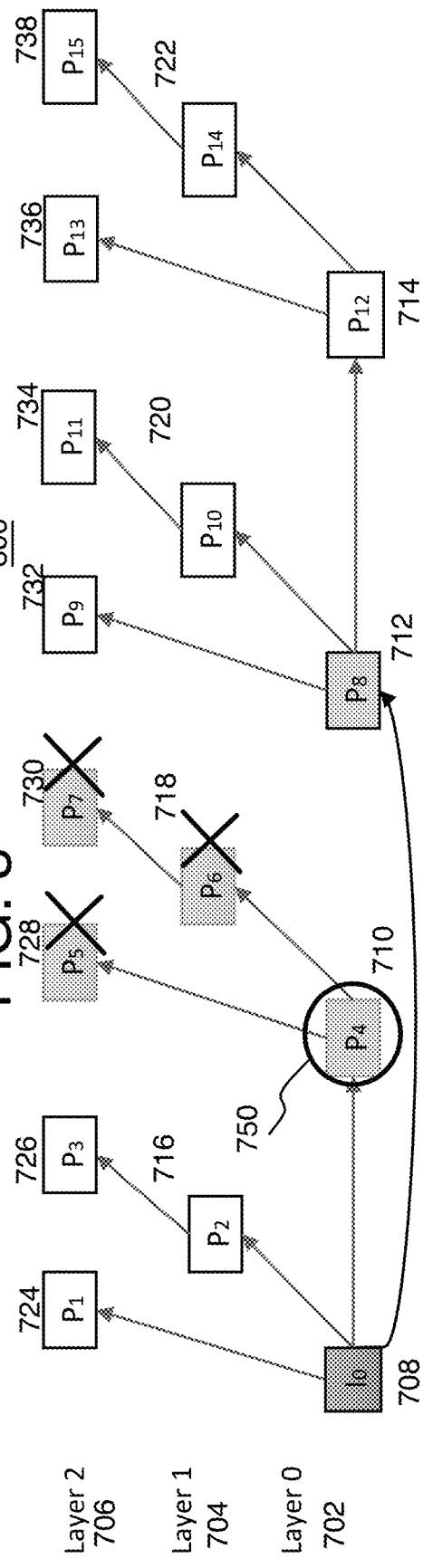
FIG. 8 is a schematic diagram of an example multi-layer video frame sequence hierarchy with frame loss and partial frame recovery according to at least one of the implementations herein.

As shown on FIG. 8, the example of structure 800 is the same situation as structure 600 where base layer frame $P_4$ 710 is lost and/or dropped. The receiver also drops the dependent frames $P_6$ 718, $P_5$ 728, and $P_7$ 730 of lost base layer frame $P_4$ 710. In response to receiving no ACK at the sender, the sender recovers next base layer frame $P_8$ 712 by changing the reference list of next base layer frame $P_8$ 712 to depend from a last base layer frame with an ACK which is base layer frame $I_0$ 708.

It should be noted for the next example that in structure 800 base layer frame $P_{12}$ 714 will reference frame $P_8$ 712 if the ACK for $P_8$ 712 is received by the sender.

Referring to FIG. 9, a multi-layer reference frame structure 900 uses the structure 700 and shows a situation where base layer frame $P_8$ 912 is the missing frame 950 either by being dropped or lost, instead of the missing base layer frame being frame $P_4$ 910. In this case, the lost recovery system performs as already described with frames $P_4$ to $P_8$ in structure 800, but now frames $P_9$ to $P_{11}$ are dropped by the receiver, as shown on structure 900, and the reference list of $P_{12}$ 914 is changed to ACK base layer frame $P_4$ 910 assuming frame $P_4$ 910 is in the encoder DPB when needed to change the reference list and decode frame $P_{12}$ 914.

Referring to FIG. 10, a multi-layer reference frame structure 1000 uses the structure 700 and shows a next situation occurring after example situation 800, but in this case, base layer frame $P_8$ 1012 also is missing either by being dropped or lost, and the next base layer frame is frame $P_{12}$ 1014. In this case, the receiver and sender performed as already described with frames $P_4$ to $P_8$ in structure 800, but now labeled as frames 1010 to 1012 on structure 1000. Once the sender determines frame $P_8$ 1012 also does not have an ACK, higher layer frames $P_9$ 1020 to $P_{11}$ 1034 are skipped (or are dropped) by the receiver as shown on structure 1000, and the sender changes the reference list of next base layer frame $P_{12}$ 1014 to have the next base layer frame $P_{12}$ 1014 depend from the last ACK base layer frame in the encoder DPB, which is the base layer frame $I_0$ 1008 in this example, thereby recovering and encoding next base layer frame $P_{12}$ 1014 and its depending higher layer frames $P_{13}$ to $P_{15}$ for transmission to the receiver and subsequent acknowledgement of next base layer frame $P_{12}$ 1014.

Referring to FIG. 11, experiments were conducted to determine the resulting frame rate using the present frame loss recovery methods, and is shown in dashed line on a chart 1100 that graphs time to frame rate. The resulting frame rate is compared to the original frame rate at the encoder, a typical received from rate using conventional techniques. The resulting frame is significantly closer to the original frame rate than conventional techniques. While the resulting frame rate here had a difference of about 4 frames per second (fps) slower than the original frame rate, the conventional techniques peaked at about 11 fps slower than the original frame rate. A frame rate when a single base layer packet is lost was provided to show a per base layer packet loss of frame rate. It was found that there can be a significant effect even with such a single base layer frame missing, and by losing about 2 fps.

While implementation of the example processes 200, 300, and 400 discussed herein may include the undertaking of all operations shown in the order illustrated, the present disclosure is not limited in this regard and, in various examples, implementation of the example processes herein may include only a subset of the operations shown, operations performed in a different order than illustrated, or additional or less operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Referring to FIG. 12, an example system or device 1200 for video coding, arranged in accordance with at least some implementations of the present disclosure. As shown in FIG. 12, system 1200 optionally may include its own one or more imaging devices 1202, whether system 1200 is a camera and imaging device unit 1202 is the camera hardware, or the system 1200 is a multi-use device such as a smartphone with an imaging device or camera 1202. Either way the imaging device 1202 may provide raw image data to logic modules 1204 when such a device is provided.

Otherwise, system 1200 also has one or more processors 1240, memory 1244, and an antenna 1250, and may have a display 1252. The logic modules 1204 may include a video processing unit 1206 that provides a pre-processing unit 1208 that pre-processes image data on the system 1200, such as in the memory 1244 or obtained from the imaging device 1202, or another source. The system 1200 may be the sender or receiver or both, such as on a smartphone that both receives and transmits video. Thus, the video processor unit 1206 may have an encoder 1210 or a decoder 1212 or both. The video processing unit 1206 also may have an ACK monitor 1214 transport module 1230, a rendering unit 1216, and other applications 1228 that use the output decoded frames or image data.

The encoder 1210 may have a reference list manager 1218, dynamic reference list unit 1220, and a prediction unit 1222, while the decoder 1212 may have a base layer frame monitor 1224 and an ACK unit 1226, and as already described above with system 100 (FIG. 1). The encoder 1210 and decoder 1212 may have many other components not mentioned here to perform encoding and decoding but are not directly relevant for explaining the methods herein.

In an implementation, memory 1244 implements buffers may have the encoder DPB 1246 and decoder jitter buffer 1248 as those are described above with system 100 and methods 200, 300, and 400. Memory 1244 also may include storage for any other image or overhead data needed to perform the methods herein. Memory 1244 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1244 may be implemented by cache memory.

Processor(s) 1240 may include any number and type of central, video, image, or graphics processing units that may provide the operations as discussed herein. Processor(s) 1240 by one form may include an Intel Atom® by one example, and is shown to also provide an image signal processor (ISP) 1242 to perform operations mentioned herein. Processor(s) 1240 may provide firmware, software, or hardware or a combination thereof, and may have programmable logic or circuitry such as a logic core or cores that may provide a wide array of programmable logic functions. In an implementation, processor(s) may include dedicated hardware such as fixed function circuitry. Fixed function circuitry may include dedicated logic or circuitry and may provide a set of fixed function entry points that may map to the dedicated logic for a fixed purpose or function.

Antenna 1250 may be provided to receive or transmit image data as described herein, and display 1252 may provide images 1254 to render decoded image data as described herein.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Figure 13:
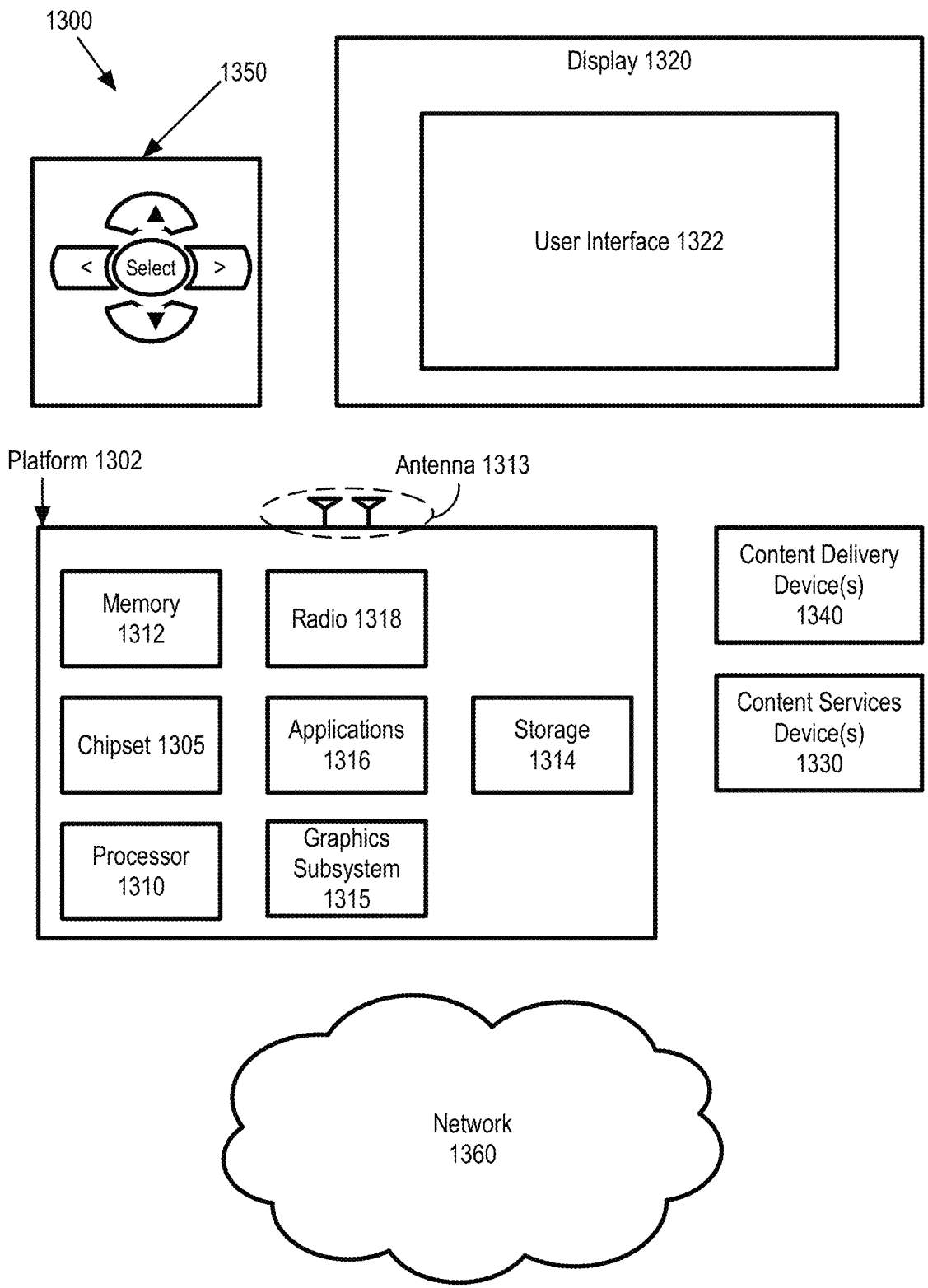
FIG. 13 is an illustrative diagram of another example system.

FIG. 13 is an illustrative diagram of an example system 1300, arranged in accordance with at least some implementations of the present disclosure. In various implementations, system 1300 may be or have the sender or encoder, or receiver or decoder (or any combination of these on the same device), and may be a mobile system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1313, antenna 1313, storage 1314, graphics subsystem 1315, applications 1316 and/or radio 1318. Chipset 1305 may provide intercommunication among processor 1310, memory 1313, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1313 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of may be used to interact with user interface 1322, for example. In various implementations, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1320) by movements of a pointer, cursor, focus ring, or other visual indicators displayed on the display. For example, under the control of software applications 1316, the navigation features located on navigation may be mapped to virtual navigation features displayed on user interface 1322, for example. In various implementations, may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 13.1 surround sound audio, for example. Drivers may include a graphics driver for integrated graphics platforms. In various implementations, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
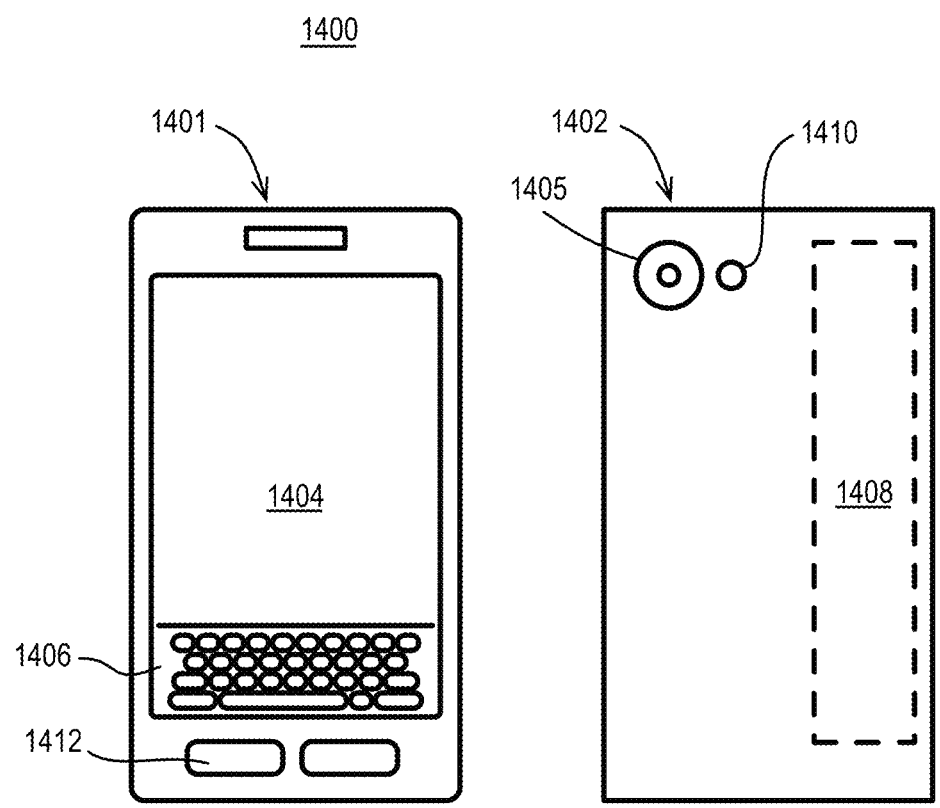
FIG. 14 illustrates an example device, all arranged in accordance with at least some implementations of the present disclosure.

As described above, system or device 1200 or 1300 may be embodied in varying physical styles or form factors. FIG. 14 illustrates an example small form factor device 1400, arranged in accordance with at least some implementations of the present disclosure. In some examples, system 1200 or 1300 may be implemented via device 1400. In other examples, system 100 or portions thereof may be implemented via device 1400. In various implementations, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include one or more cameras 1405 (e.g., including a lens, an aperture, and an imaging sensor) and a flash 1410 integrated into back 1402 (or elsewhere) of device 1400. In other examples, camera 1405 and flash 1410 may be integrated into front 1401 of device 1400 or both front and back cameras may be provided. Camera 1405 and flash 1410 may be components of a camera module to originate image data processed into streaming video that is output to display 1404 and/or communicated remotely from device 1400 via antenna 1408 for example.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first implementations, a device for video coding comprises memory to store at least one video; and at least one processor communicatively coupled to the memory and being arranged to operate by:

The following examples pertain to additional implementations.

By an example one or more first implementations, a computer-implemented method of video coding comprises obtaining input frames of a video sequence to be compressed; receiving acknowledgement messages that acknowledge an individual base layer frame of a multi-layer inter-prediction reference frame structure has sufficient data to be decoded; and updating the inter-prediction reference frame structure to be used to encode the input frames depending on whether or not the individual base layer frame has the acknowledgment.

By one or more second implementation, and further to the first implementation, wherein the updating occurs in time to decode a next base layer frame based on an updated reference list, wherein the time starts from when it is determined that the individual base layer frame does not have sufficient data.

By one or more third implementations, and further to the first or second implementation, wherein the method comprising monitoring a feedback channel providing the acknowledgements to discover which base layer frames are to be used for decoding and which base layer frames are to be dropped.

By one or more fourth implementations, and further to any of the first to third implementation, wherein the updating comprises changing a reference list of a base layer frame.

By one or more fifth implementations, and further to any of the first to fourth implementation, wherein the updating comprises changing a base layer reference frame of a next base layer frame from a previous base layer reference frame without an acknowledgement to a base layer reference frame with the acknowledgement.

By one or more sixth implementations, and further to any of the first to fifth implementation, wherein the method comprising encoding non-base layer frames that directly or indirectly reference a next base layer frame that initially depended on an individual frame that is not acknowledged.

By one or more seventh implementations, and further to any of the first to sixth implementation, wherein the method comprising placing non-base layer frames in a decoded frame buffer at an encoder and to be used as inter-prediction reference frames depending on whether or not the base layer frame received an acknowledgment.

By one or more example eighth implementations, computer-implemented method of video coding comprises obtaining compressed frames of a video sequence; determining whether a compressed frame of the video sequence that is a base layer frame of a multi-layer inter-prediction reference frame structure has sufficient data to be decoded; and transmitting an acknowledgement message when an individual base layer frame has sufficient data to be decoded, and omitting the transmission of the acknowledgement when the individual frame does not have sufficient data.

By one or more ninth implementations, and further to the eighth implementation, wherein the method comprising transmitting the acknowledgement message in time so that an encoder can transmit a revised reference list of a next base layer frame and back to a decoder associated with the acknowledgements.

By one or more tenth implementations, and further to the eighth or ninth implementation, wherein the determining comprises monitoring the data of individual frames at a jitter buffer of a decoder.

By one or more eleventh implementations, and further to any of the eighth to tenth implementation, wherein the monitoring comprises determining whether a base layer frame has a minimum number of data packets to decode the base layer frame.

By one or more twelfth implementations, and further to any of the eighth to eleventh implementation, wherein the method comprising, transmitting the acknowledgement message in a dedicated data feedback channel.

By one or more thirteenth implementations, and further to any of the eighth to twelfth implementation, wherein the method comprising the acknowledgement message includes a frame time stamp or picture ID or both.

By an example one or more fourteenth implementations, a computer implemented system of video coding comprises memory; and at least one processor communicatively coupled to the memory and being arranged to operate by: obtaining input frames of a video sequence to be compressed; receiving acknowledgement messages to acknowledge that an individual base layer frame of a multi-layer inter-prediction reference frame structure has sufficient data to be decoded; and updating the inter-prediction reference frame structure to be used to encode the input frames depending on whether or not the individual base layer frame has the acknowledgment.

By one or more fifteenth implementations, and further to the fourteenth implementation, wherein the updating comprises holding one or more base layer frames with acknowledgments in a multi-frame encoder decoded picture buffer and for a sufficient duration to use the one or more base layer frames as a reference frame for at least one subsequent base layer frame that is encoded after at least one base layer frame without an acknowledgement.

By one or more sixteenth implementations, and further to the fourteenth or fifteenth implementation, wherein the updating comprises performing a negative acknowledgement (NACK) operation that generates a replacement base layer frame when no acknowledged base layer frames exist in a multi-frame encoder decoded picture buffer.

By one or more seventeenth implementations, and further to any of the fourteenth to sixteenth implementation, wherein the updating occurs in time to decode a next base layer frame based on an updated reference list, wherein the time starts from when it is determined that the individual base layer frame does not have sufficient data.

By one or more eighteenth implementations, and further to any of the fourteenth to seventeenth implementation, wherein the at least one processor being arranged to operate by transmitting compressed frames to a decoder that monitors a jitter buffer to determine whether the individual frames have sufficient data to be decoded in order to generate the acknowledgement messages.

By one or more nineteenth implementations, and further to any of the fourteenth to eighteenth implementation, wherein the updating comprises changing which previous base layer frame is a reference frame for a next base layer frame on the base layer after the individual base layer without an acknowledgement.

By an example one or more twentieth implementations, at least one non-transitory machine readable medium comprises instructions that when executed on a computing device, cause the computing device to operate by: obtaining compressed frames of a video sequence; determining whether a compressed frame of the video sequence that is a base layer frame of a multi-layer inter-prediction reference frame structure has sufficient data to be decoded or was decoded; and transmitting an acknowledgement message when the individual base layer frame has sufficient data to be decoded, and omitting the transmission of the acknowledgement when sufficient data is not present.

By one or more twenty-first implementations, and further to the twentieth implementation, wherein the transmitting comprises transmitting the acknowledgement message in time for an encoder to transmit a revised reference list of a next base layer frame in time for a decoder to decode the next base layer frame according to the revised reference list.

By one or more twenty-second implementations, and further to the twentieth or twenty-first implementation, wherein the determining comprises monitoring a jitter buffer to determine which individual base layer frame should have an acknowledgement message.

By one or more twenty-third implementations, and further to any one of the twentieth to twenty-second implementation, wherein the transmitting comprises transmitting acknowledgement messages that cause an encoder to update a reference list by changing the multi-layer inter-prediction reference frame structure to be used to decode the next base layer frame; and wherein the instructions cause the computing device to operate by decoding the next base layer frame having the updated reference list.

By one or more twenty-fourth implementations, and further to any of the twentieth to twenty-third implementation, wherein the maximum time to receive the acknowledgment over a feedback channel is about three frames rate intervals.

By one or more twenty-fifth implementations, and further to any of the twentieth to twenty-fourth implementation, wherein the acknowledgement messages only expressly indicate a status of the base layer frames.

In one or more twenty-sixth implementations, a device or system includes a memory and a processor to perform a method according to any one of the above implementations.

In one or more twenty-seventh implementations, at least one machine readable medium comprises instructions that when executed on a computing device, causes the computing device to perform a method according to any one of the above implementations.

In one or more twenty-eighth implementations, an apparatus may include means for performing a method according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. A computer-implemented method of video coding comprising:
    obtaining input frames of a video sequence to be compressed using a dyadic hierarchy structure, wherein the dyadic hierarchy structure comprises base layer frames separated by a predetermined number of non-base layer frames, and the base layer frames comprises an I-frame that does not have a reference frame and P-frames that have linear dependency to another base layer frame;
    receiving acknowledgement messages from a receiver that acknowledge the receiver has sufficient data to decode an individual base layer frame of the dyadic hierarchy structure;
    holding one or more acknowledged base layer frames in an encoder decoded picture buffer;
    determining that an acknowledgement for a first base layer frame has not been received at the receiver within a maximum time, the maximum time corresponding to a time for the receiver to display the predetermined number of non-base layer frames separating two base layer frames;
    in response to determining that the acknowledgement for the first base layer frame has not been received at the receiver within the maximum time and determining that a last acknowledged base layer frame is present in the encoder decoded picture buffer, updating a base reference frame in an updated reference list for a next base layer frame to the last acknowledged base layer frame; and
    in response to determining that the acknowledgement for the first base layer frame has not been received at the receiver within the maximum time and determining that no acknowledged base layer frame is present in the encoder decoded picture buffer, re-transmit one or more packets for a replacement base layer frame to the receiver.

2. The computer-implemented method of claim 1, wherein:
    the updating occurs in time for the receiver to decode the next base layer frame based on the updated reference list, and
    the time for the receiver to display the predetermined number of non-base layer frames starts from when it is determined that the individual base layer frame does not have sufficient data.

3. The computer-implemented method of claim 1, further comprising monitoring a feedback channel with the receiver for the acknowledgement messages to discover which base layer frames are to be used for decoding and which base layer frames are dropped.

4. The computer-implemented method of claim 1, further comprising encoding non-base layer frames that directly or indirectly reference the next base layer frame that initially depended on the first base layer frame that is not acknowledged.

5. The computer-implemented method of claim 1, further comprising placing non-base layer frames in a decoded frame buffer at an encoder and to be used as inter-prediction reference frames depending on whether or not the first base layer frame received an acknowledgment.

6. A computer-implemented system of video coding comprising:
   memory; and
   at least one processor communicatively coupled to the memory and being arranged to operate by:
      obtaining input frames of a video sequence to be compressed using a dyadic hierarchy structure, wherein the dyadic hierarchy structure comprises base layer frames separated by a predetermined number of non-base layer frames, and the base layer frames comprises an I-frame that does not have a reference frame and P-frames that have linear dependency to another base layer frame;
      receiving acknowledgement messages from a receiver that acknowledge the receiver has sufficient data to decode an individual base layer frame of the dyadic hierarchy structure;
      determining that an acknowledgement for a first base layer frame has not been received at the receiver within a maximum time, the maximum time corresponding to a time for the receiver to display the predetermined number of non-base layer frames separating two base layer frames; and
      in response to determining that the acknowledgement for the first base layer frame has not been received at the receiver within the maximum time, updating a base reference frame in an updated reference list for a next base layer frame to a last acknowledged base layer frame.

7. The computer-implemented system of claim 6, wherein the at least one processor is arranged to operate further by:
   holding one or more acknowledged base layer frames with acknowledgments in a multi-frame encoder decoded picture buffer and for a sufficient duration to use the one or more acknowledged base layer frames as the base reference frame in the updated reference list for the next base layer frame.

8. The computer-implemented system of claim 7, wherein the updating is performed in response to determining that the last acknowledged base layer frame is present in the multi-frame encoder decoded picture buffer.

9. The computer-implemented system of claim 7, wherein the at least one processor is arranged to operate further by:
   determining that no acknowledged base layer frames exist in the multi-frame encoder decoded picture buffer; and
   in response to determining that no acknowledged base layer frames exist in the multi-frame encoder decoded picture buffer, re-transmit one or more packets for a replacement layer frame to the receiver.

10. The computer-implemented system of claim 6, wherein:
   the updating occurs in time for the receiver to decode the next base layer frame based on the updated reference list; and
   the time for the receiver to display the predetermined number of non-base layer frames starts from when it is determined that the individual base layer frame does not have sufficient data.

11. The computer-implemented system of claim 6, wherein the receiver monitors a jitter buffer to determine whether the base layer frames have sufficient data to be decoded in order to generate the acknowledgement messages.

12. At least one non-transitory computer readable medium comprising instructions that when executed on a computing device, cause the computing device to operate by:
   obtaining input frames of a video sequence to be compressed using a dyadic hierarchy structure, wherein the dyadic hierarchy structure comprises base layer frames separated by a predetermined number of non-base layer frames, and the base layer frames comprises an I-frame that does not have a reference frame and P-frames that have linear dependency to another base layer frame;
   receiving acknowledgement messages from a receiver that acknowledge the receiver has sufficient data to decode an individual base layer frame of the dyadic hierarchy structure;
   determining that an acknowledgement for a first base layer frame has not been received at the receiver within a maximum time, the maximum time corresponding to a time for the receiver to display the predetermined number of non-base layer frames separating two base layer frames; and
   in response to determining that the acknowledgement for the first base layer frame has not been received at the receiver within the maximum time, updating a base reference frame in an updated reference list for a next base layer frame to a last acknowledged base layer frame.

13. The at least one non-transitory computer readable medium of claim 12, wherein the instructions cause the computing device to operate further by:
   holding one or more acknowledged base layer frames with acknowledgments in a multi-frame encoder decoded picture buffer.

14. The at least one non-transitory computer readable medium of claim 13, wherein the holding comprises:
   holding the one or more acknowledged base layer frames for a sufficient duration to use the one or more acknowledged base layer frames as the base reference frame in the updated reference list for the next base layer frame.

15. The at least one non-transitory computer readable medium of claim 13, wherein the updating is performed in response to determining that the last acknowledged base layer frame is present in the multi-frame encoder decoded picture buffer.

16. The at least one non-transitory computer readable medium of claim 13, wherein the instructions cause the computing device to operate further by:
   determining that no acknowledged base layer frames exist in the multi-frame encoder decoded picture buffer; and
   in response to determining that no acknowledged base layer frames exist in the multi-frame encoder decoded picture buffer, re-transmit one or more packets for a replacement base layer frame to the receiver.

17. The at least one non-transitory computer readable medium of claim 16, wherein the one or more packets for the replacement base layer frame are stored in and retrieved from a real-time transport module.

18. The at least one non-transitory computer readable medium of claim 12, wherein the updating occurs in time for the receiver to decode the next base layer frame based on the updated reference list.

19. The at least one non-transitory computer readable medium of claim 12, wherein the time for the receiver to display the predetermined number of non-base layer frames starts from when it is determined that the individual base layer frame does not have sufficient data.

20. The at least one non-transitory computer readable medium of claim 12, wherein the receiver monitors a jitter buffer to determine whether the base layer frames have sufficient data to be decoded in order to generate the acknowledgement messages.

21. The at least one non-transitory computer readable medium of claim 12, wherein the instructions cause the computing device to operate further by:
monitoring a feedback channel with the receiver for the acknowledgement messages to discover which base layer frames are to be used for decoding and which base layer frames are dropped.

22. The at least one non-transitory computer readable medium of claim 12, wherein the instructions cause the computing device to operate further by:
placing non-base layer frames in a decoded frame buffer at an encoder and to be used as inter-prediction reference frames depending on whether or not the first base layer frame received an acknowledgment.

23. An encoder, comprising:
one or more processors to execute instructions; and
memory to store the instructions and a decoded picture buffer, wherein the instructions, when executed by the one or more processors, cause the one or more processors to:
receive input frames of a video sequence to be compressed using a dyadic hierarchy structure, wherein the dyadic hierarchy structure comprises base layer frames separated by a predetermined number of non-base layer frames, and the base layer frames comprises an I-frame that does not have a reference frame and P-frames that have linear dependency to another base layer frame;
monitor a feedback channel with a receiver for acknowledgement messages from the receiver that acknowledge the receiver has sufficient data to decode an individual base layer frame of the dyadic hierarchy structure;
determine that an acknowledgement for a first base layer frame has not been received at the receiver within a maximum time, the maximum time corresponding to a time for the receiver to display the predetermined number of non-base layer frames separating two base layer frames;
in response to determining that the acknowledgement for the first base layer frame has not been received at the receiver within the maximum time, updating a base reference frame in an updated reference list for a next base layer frame to a last acknowledged base layer frame; and
encoding non-base layer frames that directly or indirectly reference the next base layer frame that initially depended on the first base layer frame that is not acknowledged.

24. The encoder of claim 23, wherein the instructions cause the one or more processors further to:
holding one or more acknowledged base layer frames with acknowledgments in the decoded picture buffer;
wherein the updating is performed in response to determining that the last acknowledged base layer frame is present in the decoded picture buffer.

25. The encoder of claim 23, wherein the instructions cause the one or more processors further to:
in response to determining that no acknowledged base layer frames exist in the decoded picture buffer, re-transmit one or more packets for a replacement layer frame to the receiver.

* * * * *